United States Patent
Livanos et al.

(10) Patent No.: US 11,234,158 B2
(45) Date of Patent: *Jan. 25, 2022

(54) SYSTEM AND METHOD FOR DEFERRED DELIVERY OF CONTENT BASED ON CONGESTION IN A NETWORK ENVIRONMENT

(71) Applicant: Cisco Technology, Inc., San Jose, CA (US)

(72) Inventors: Konstantin Livanos, Naperville, IL (US); John M. Graybeal, Califon, NJ (US); Sebastian Speicher, Wallisellen (CH)

(73) Assignee: Cisco Technology, Inc., San Jose, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 16/190,082

(22) Filed: Nov. 13, 2018

(65) Prior Publication Data

US 2019/0132768 A1    May 2, 2019

Related U.S. Application Data

(63) Continuation of application No. 14/645,206, filed on Mar. 11, 2015, now Pat. No. 10,129,788.

(51) Int. Cl.
*H04W 28/02*    (2009.01)
*H04M 15/00*    (2006.01)
(Continued)

(52) U.S. Cl.
CPC ..... *H04W 28/0289* (2013.01); *H04L 12/1407* (2013.01); *H04L 12/1485* (2013.01);
(Continued)

(58) Field of Classification Search
CPC ..... H04L 12/1485; H04L 47/31; H04L 65/80; H04L 12/1407; H04L 12/1489;
(Continued)

(56) References Cited

U.S. PATENT DOCUMENTS 8,780,720 B2    7/2014    Ramadas
10,129,788 B2   11/2018   Livanos et al.
(Continued)

FOREIGN PATENT DOCUMENTS

WO    2013093653 A1    6/2013

OTHER PUBLICATIONS

"ETSI TS 132 298 V12.5.0 (Oct. 2014) Technical Specification: Digital cellular Telecommunications System (Phase 2+); Universal Mobile TelecommunicationsSystem (UMTS); LTE; Telecommunication management; Charging management; Charging Data Record (CDR) parameter description (3GPP TS 32.298 version 12.5.0 Release 12)," ETSI, 650 Route des Lucioles, F-06921 Sophia Antipolis Cedex—France; Oct. 2014; Sections and Section 6 Only.
(Continued)

*Primary Examiner* — Mandish K Randhawa
(74) *Attorney, Agent, or Firm* — Patterson + Sheridan, LLP (57) ABSTRACT

A method is provided in one example embodiment and may include receiving congestion information for an environment in which a user equipment (UE) is operating; receiving a first request to deliver content to the UE; determining that the environment in which the UE is operating is experiencing congestion based, at least in part, on the congestion information; determining a re-try interval based, at least in part, on the congestion information; and deferring delivery of the content to the UE until the re-try interval has expired. In one example embodiment, the method can include provisioning one or more policy rules for a service data flow
(Continued)

associated with the content and communicating the indication indicating that delivery of the content has been deferred to a charging system to set charging information for at least one of a user associated with the UE or a provider of the content.

19 Claims, 5 Drawing Sheets

(51) Int. Cl.
  *H04W 28/12* (2009.01)
  *H04L 12/851* (2013.01)
  *H04L 12/833* (2013.01)
  *H04L 29/06* (2006.01)
  *H04L 12/14* (2006.01)
  *H04W 4/24* (2018.01)

(52) U.S. Cl.
  CPC .......... *H04L 12/1489* (2013.01); *H04L 47/24* (2013.01); *H04L 47/31* (2013.01); *H04L 65/4084* (2013.01); *H04L 65/80* (2013.01); *H04M 15/66* (2013.01); *H04M 15/8016* (2013.01); *H04M 15/8027* (2013.01); *H04M 15/8055* (2013.01); *H04M 15/8061* (2013.01); *H04W 4/24* (2013.01); *H04W 28/12* (2013.01)

(58) Field of Classification Search
  CPC ............... H04L 47/24; H04L 65/4084; H04W 28/0289; H04W 28/12; H04W 4/24; H04M 15/66; H04M 15/8061; H04M 15/8016; H04M 15/8027; H04M 15/8055
  See application file for complete search history.

(56) References Cited

U.S. PATENT DOCUMENTS

| | | | |
|---|---|---|---|
| 2004/0180677 A1 | 9/2004 | Harris | |
| 2010/0146272 A1* | 6/2010 | Centonza | H04W 12/1202 713/168 |
| 2011/0055413 A1 | 3/2011 | Lobsenz | |
| 2011/0201303 A1* | 8/2011 | Cutler | H04L 12/14 455/406 |
| 2011/0280216 A1 | 11/2011 | Li | |
| 2011/0314145 A1 | 12/2011 | Raleigh | |
| 2012/0215839 A1 | 8/2012 | Doyle | |
| 2013/0301547 A1* | 11/2013 | Gupta | H04W 4/06 370/329 |
| 2014/0310426 A1 | 10/2014 | Damola | |
| 2016/0029247 A1 | 1/2016 | Shan | |

OTHER PUBLICATIONS

"ETSI TS 132 251 V12.7.0 (Oct. 2014) Technical Specification: Digital cellular Telecommunications System (Phase 2+); Universal Mobile Telecommunications System (UMTS); LTE; Telecommunication management; Charging management; Packet Switched (PS)domain charging (3GPP TS 32.251 version 12.7.0 Release 12)," ETSI, 650 Route des Lucioles, F-06921 Sophia Antipolis Cedex—France; Oct. 2014; Section 3 through 6 Only.

"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles,F-06921 Sophia Antipolis Cedex—France; Oct. 2014; 64 pages.

"ETSI TS 129 212 V12.6.0 (Oct. 2014) Technical Specification: Universal Mobile Telecommunications System (UMTS); LTE; Policy and Charging Control (PCC); Reference points (3GPP TS 29.212 version 12.6.0 Release 12)," ETSI, 650 Route des Lucioles,F-06921 Sophia Antipolis Cedex—France; Oct. 2014; Section 3 through 6 Only.

"ETSI TS 129 061 V12.7.0 (Oct. 2014) Technical Specification: Digital cellular Telecommunications System (Phase 2+); Universal Mobile Telecommunications System (UMTS); LTE; Interworking between the Public Land Mobile Network (PLMN) supporting packetbased services and Packet Data Networks (PDN) (3GPP TS 29 061 version 12.7.0 Release (12)," ETSI, 650 Route des Lucioles, F-06921 Sophia Antipolis Cedex—France; Oct. 2014; 170 pages.

"ETSI TS 122 142 V12.0.0 (Oct. 2014) Technical Specification: Digital cellular Telecommunications System (Phase2+); Universal Mobile Telecommunications System (UMTS); Value Added Services (VAS) for Short Message Service (SMS) requirements (3GPP TS22 142 version 12.0 0 Release 12)," ETSI, 650 Route des Lucioles, F-06921 Sophia Antipolis Cedex—France; Oct. 2014; 14 pages.

"3GPP TS 23.203 V13.1.0 (Sep. 2014) Technical Specification: 3rd Generation Partnership Project; Technical Specification Group Services and System Aspects; Policy and charging control architecture (Release 13)," 3GPP, 650 Route des Lucioles—SophiaAntipolis Valbonne—France, Sep. 2014; Introduction through Section 6 Only.

"3GPP TS 29.217 V1.0.0 (Nov. 2014) Technical Specification: 3rd Generation Partnership Project; Technical Specification Group Core Network and Terminals; Policy and Charging Control over Np reference point (Release 13)," 3GPP, 650 Route desLucioles—Sophia Antipolis Valbonne—France, Nov. 2014; 20 pages.

"3GPP TS 23.002 V13.1.0 (Dec. 2014) Technical Specification: Technical Specification 3rd Generation Partnership Project; Technical Specification Group Services and System Aspects; Network architecture (Release 13)," 3GPP, 650 Route desLucioles—Sophia Antipolis Valbonne—France, Dec. 2014; 109 pages.

* cited by examiner

SYSTEM AND METHOD FOR DEFERRED DELIVERY OF CONTENT BASED ON CONGESTION IN A NETWORK ENVIRONMENT

TECHNICAL FIELD

This disclosure relates in general to the field of communications and, more particularly, to a system and method for deferred delivery of content based on congestion in a network environment.

BACKGROUND

Networking architectures have grown increasingly complex in communications environments, particularly mobile wireless environments. Mobile communication networks have grown substantially in subscriber base as end users become increasingly connected to mobile wireless environments. As the number of mobile subscribers increases, efficient management of communication resources becomes more critical. In some instances, congestion in a network can cause network resources to become overloaded and can result in degraded user experience. Accordingly, there are significant challenges in managing network resources, particularly when congestion occurs in the network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and may include receiving congestion information for an environment in which a user equipment (UE) is operating; receiving a first request to deliver content to the UE; determining that the environment in which the UE is operating is experiencing congestion based, at least in part, on the congestion information; determining a re-try interval based, at least in part, on the congestion information; and deferring delivery of the content to the UE until the re-try interval has expired. In some instances, the environment can include at least one cell in a Radio Access Network (RAN) in which the UE is operating that is experiencing congestion.

The method can further include determining a deferred content identifier for identifying the content, wherein the re-try interval and the deferred content identifier are determined by a Policy and Charging Rules Function (PCRF) and wherein the content is associated with a service data flow; and storing the re-try interval, the deferred content identifier and identifying information for the service data flow in at least one of storage for the PCRF or storage for a subscription profile repository (SPR). In some cases, the first request to deliver the content can be initiated by an Application Function (AF) and the method can include communicating the re-try interval and the deferred content identifier to the AF by the PCRF; and initiating a second request to deliver the content by the AF when the re-try interval has expired, wherein the second request includes, at least in part, the re-try interval and the deferred content identifier.

In some cases, the method can include retrieving the re-try interval and the deferred content identifier from storage; verifying that the re-try interval has expired; provisioning one or more policy rules for the service data flow associated with the content; communicating the one or more policy rules and an indication indicating that delivery of the content has been deferred to at least one of a packet data network gateway or a traffic detection function; and communicating the indication indicating that delivery of the content has been deferred to a charging system to set charging information for at least one of a user associated with the UE or a provider of the content.

In some instances, the re-try interval can further be determined, at least in part, by using one or more of: a subscription profile of a user associated with the UE; a user profile of a user associated with the UE; information associated with the content; information associated with a provider of the content; and current usage in the environment.

In still other cases, the method can include collecting congestion measurement information for the environment; requesting a list of one or more user equipment in the environment and a corresponding list of active access point names for which each of the user equipment have an active session; determining a corresponding serving Policy and Charging Rules Function (PCRF) for each of the one or more user equipment; and communicating the congestion information to each corresponding PCRF for each of the one or more user equipment. In some instances, the collecting, the requesting, the determining and the communicating are performed by a Radio Access Network (RAN) Congestion Awareness Function (RCAF).

Example Embodiments

Figure 1:
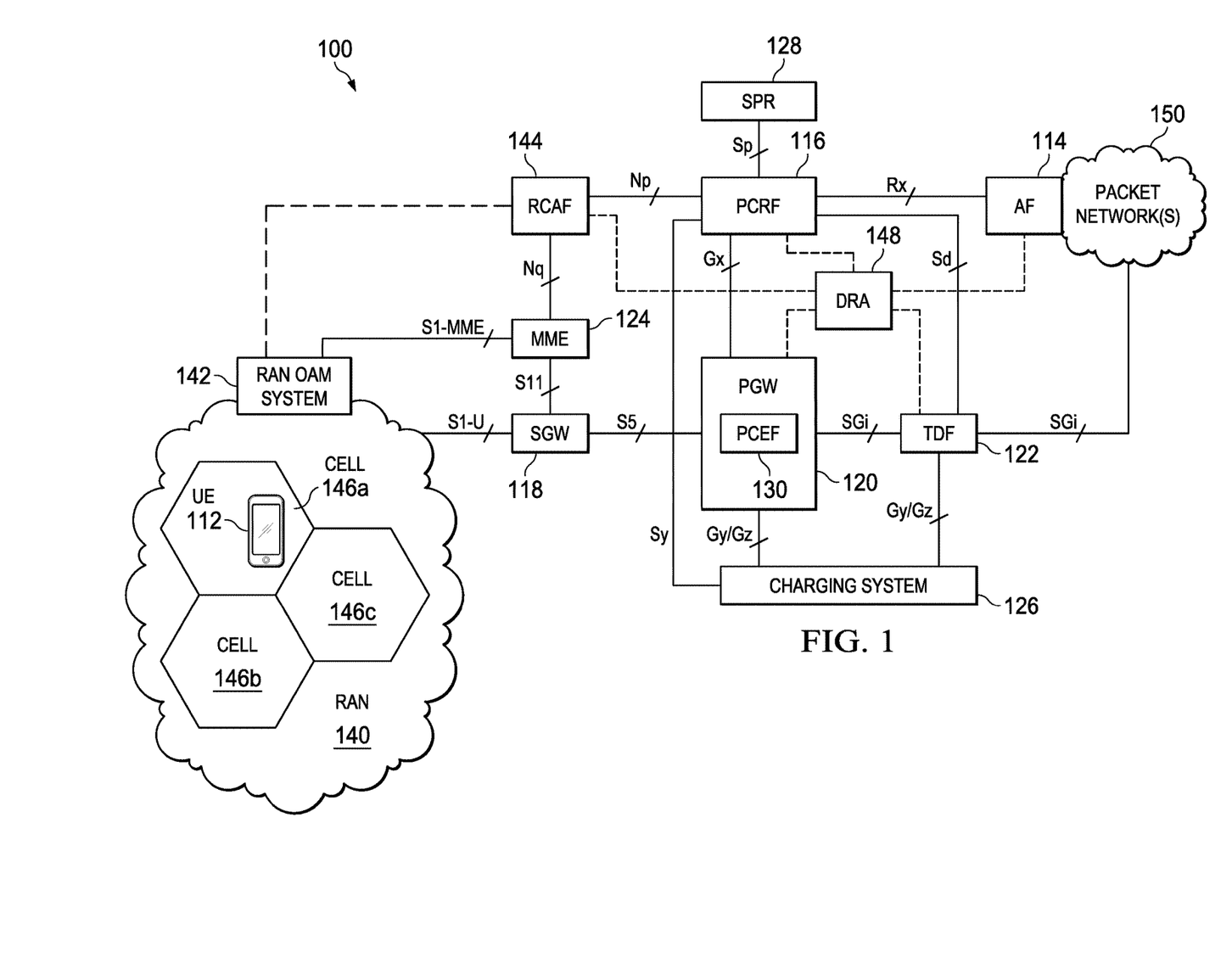
FIG. 1 is a simplified block diagram illustrating a communication system to facilitate deferred delivery of content based on congestion in a network environment according to one embodiment of the present disclosure.

Turning to FIG. 1, FIG. 1 is a simplified block diagram illustrating a communication system 100 to facilitate providing deferred delivery of content based on congestion in a network environment according to one embodiment of the present disclosure. This particular configuration may be tied to the 3rd Generation Partnership Project (3GPP) Evolved Packet System (EPS) architecture, also sometimes referred to as the Long Term Evolution (LTE) EPS architecture. Alternatively, the depicted architecture may be applicable to other environments equally.

The example architecture of FIG. 1 includes a user operating user equipment 112, an Application Function (AF) 114, a Policy and Charging Rules function (PCRF) 116, a serving gateway (SGW) 118 and a packet data network (PDN) gateway (PGW) 120, which can include a Policy and Charging Enforcement Function (PCEF) 130. Also included are a Traffic Detection Function 122, a Mobility Management Entity (MME) 124, a charging system 126, a subscription profile repository (SPR) 128, a radio access network (RAN) 140, a RAN Operations Administration and Management (OAM) system 142, a RAN Congestion Awareness Function (RCAF) 144, a DIAMETER Routing Agent (DRA) 148 and one or more packet network(s) 150. RAN 140 can include one or more cell(s) 146a-146c. Note for various embodiments outlined herein, any corresponding PGW and PCEF (e.g., PGW 120 and PCEF 130) can be referred to collectively as 'PGW/PCEF', as various operations, functions and/or activities discussed for various embodiments described herein can be performed with these network elements operating in conjunction with each other.

In various embodiments, communication system 100 can represent a series of points or nodes of interconnected communication paths (wired or wireless) for receiving and transmitting packets of information that propagate through communication system 100. In various embodiments, communication system 100 can be associated with and/or provided by a single network operator or service provider and/or multiple network operators or service providers. Communication system 100 may offer communicative interfaces between UE 112 and selected nodes or elements in the network, and may be any local area network (LAN), wireless local area network (WLAN), metropolitan area network (MAN), wide area network (WAN), virtual private network (VPN), Intranet, extranet, or any other appropriate architecture or system that facilitates communications in a network environment. Communication system 100 may implement a user datagram protocol (UDP)/Internet protocol (UDP/IP) connection and use a transmission control protocol (TCP/IP) communication language protocol in particular embodiments of the present disclosure. However, communication network may alternatively implement any other suitable communication protocol for transmitting and receiving data packets within communication system 100.

RAN 140 is a communications interface between UE 112 and MME 124, SGW 118 and PGW 120/PCEF 130. Thus, RAN 140 may provide one or more coverage areas, shown in FIG. 1 as cells 146a-146c for servicing multiple end users and for managing their associated connectivity. The communications interface provided by RAN 140, may allow data to be exchanged between an end user and any number of selected elements within communication system 100. For example, RAN 140 may facilitate the delivery of a request packet generated by a given UE (e.g., UE 112) and the reception of information sought by an associated end user.

In general, access networks (e.g., RAN 140) may operate to provide 3GPP access networks including legacy access networks such as Global System for Mobile communications (GSM) Enhanced Data rates for GSM Evolution (EDGE) Radio Access Network (GERAN), Universal Mobile Telecommunications System (UMTS) Terrestrial Radio Access Network (UTRAN), generally referred to as 3G, and/or LTE access networks such as Evolved UTRAN (EUTRAN), generally referred to as 4G/LTE/LTE-Advanced (LTE-A), or they may operate to provide non-3GPP IP access networks such as digital subscriber line (DSL), Cable, WLAN (e.g., WiMAX, WiFi) or the Internet.

In various embodiments, depending on deployment, RAN 140 can include radio interface equipment to provide macro and or small cell mobile/cellular coverage for UE 112. In general, Node Bs (NodeBs), Home Node Bs (HNBs), and/or Radio Network Controllers (RNCs) can be deployed to provide coverage for 3G macro and/or small cells. In general, evolved Node Bs (eNodeBs) and/or Home eNodeBs (HeNBs) can be deployed to provide coverage for 4G/LTE/LTE-A macro and/or small cell access networks. In general, small cell networks differ from macro networks in that small cell networks are typically comprised of multiple small cell access points, which can provide proximate coverage to users in an environment in which macro network coverage may be limited or interfered (e.g., within a building, structure, facility, etc.). Other suitable types of communications interfaces may be used for any appropriate network design and, further, be based on specific communications architectures in accordance with particular needs. In various embodiments cells 146a-146c can be deployed as small cells and/or macro cells and may provide access for 3GPP access networks (e.g., 3G/4G/LTE/LTE-A, etc.) and/or non-3GPP access networks (WiFi, WiMAX, etc.). Each cell 146a-146c may be identified using a corresponding cell identifier (cell-ID). In various embodiments, the cell-ID can be a Cell Global Identifier (e.g., for 3G access networks), evolved Cell Global Identifier (ECGI) or some other identifier, which may uniquely identify a cell.

In various embodiments, RAN OAM system 142 may provide operations, administration and management functions to enable operation and/or monitoring of RAN 140 including, but not limited to: monitoring, measuring and/or managing cell-level operations, resources, etc. (e.g., cell loading, radio frequency (RF) conditions, RF signal strength, etc.) for macro and/or small cell networks; monitoring, measuring and/or managing RAN-level resources and/or congestion (e.g., network loading, load balancing, etc.), combinations thereof or the like.

Also provided in the architecture of FIG. 1 are a series of interfaces, which can offer mobility, policy control, Authentication, Authorization and Accounting (AAA) functions and/or charging activities (offline and online) for various network elements. For example, interfaces can be used to exchange point of attachment, location, and/or access data for one or more end users, for example, users operating UE 112. Resource information, accounting information, location information, access network information, network address translation (NAT) control, etc. can be exchanged using a remote authentication dial in user service (RADIUS) protocol or any other suitable protocol where appropriate. Other protocols that can be used in communication system 100 can include DIAMETER protocol, service gateway interface (SGi), terminal access controller access-control system (TACACS), TACACS+, etc.

Generally, interfaces, such as, for example SGi, Rx, Gx, Gy, Gz, Sp, Sd, Np, Nq, etc. can represent reference points for certain communication protocols which may facilitate communications between various network elements as generally provided in 3GPP Technical Specification (TS) 23.002, TS 23.203, TS 29.212, TS 29.214, TS 29.217, etc. As shown in FIG. 1, a DIAMETER-based Rx interface can be provisioned between PCRF 116 and AF 114; a DIAMETER-based Sd interface can be provisioned between PCRF 116 and TDF 122; a DIAMETER-based Gx interface can be provisioned between PCRF 116 and PGW 120/PCEF 130; a DIAMETER-based Gy and/or Gz (Gy/Gz) interface can be provisioned between PGW 120/PCEF 130 and charging system 126 (e.g., for an Online Charging System (OCS) the Gy interface may be used and for an Offline Charging System (OFCS) the Gz interface may be used); and a DIAMETER-based Sp interface may be maintained between SPR 128 and PCRF 116. An SGi interface can be provisioned between PGW 120/PCEF 130 and TDF 122 and another SGi interface can be provisioned between TDF 122 and packet network(s) 150.

Other interfaces are illustrated in FIG. 1, such as, for example, an Np interface between PCRF 116 and RCAF 144 for communicating user plane congestion (UPCON) information; an Nq interface between MME 124 and RCAF 144 for communication UPCON information; an S11 interface between MME 124 and SGW 118; an S1 user (S1-U) interface between RAN 140 (e.g., an eNodeB (not shown) within RAN 140) and SGW 118 for communicating user plane traffic; an S1-MME interface between RAN OAM system 142 and MME 124 for communicating control plane information; an S11 interface between MME 124 and SGW for communicating control plane information; and an S5 interface between SGW 118 and PGW 120 for communicating user plane traffic.

In various embodiments, UE 112 can be associated with users, employees, clients, customers, etc. wishing to initiate a flow in communication system 100 via some network. The terms 'user equipment', 'mobile node', 'end user', 'user', and 'subscriber' are inclusive of devices used to initiate a communication, such as a computer, a personal digital assistant (PDA), a laptop or electronic notebook, a cellular telephone, an i-Phone™, i-Pad™, a Google Droid™ phone, an IP phone, or any other device, component, element, or object capable of initiating voice, audio, video, media, or data exchanges within communication system 100. UE 112 may also be inclusive of a suitable interface to a human user such as a microphone, a display, a keyboard, or other terminal equipment. UE 112 may also be any device that seeks to initiate a communication on behalf of another entity or element such as a program, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another.

In certain embodiments, UE 112 may have a bundled subscription for network access and application services (e.g., voice), etc. In various embodiments, UE IP addresses for UE 112 can be assigned using dynamic host configuration protocol (DHCP), Stateless Address Auto-configuration, default bearer activation, etc., or any suitable variation thereof as prescribed in 3GPP TS 29.061. In general, a given UE (e.g., UE 112) can be associated with an identity, such as, for example, an International Mobile Subscriber Identity (IMSI), which may be associated with a subscriber operating UE 112.

Among other things, MME 124 may provide tracking area list management, idle mode UE tracking, bearer activation and deactivation, serving gateway and packet data network gateway selection for UEs and authentication services. As shown in FIG. 1, MME 124 may be in communication with RAN OAM system 142, RCAF 144 and SGW 118. SGW 118 is a data plane element that can route and forward user data packets, while also acting as a mobility anchor for the user plane during inter-cell handovers and as an anchor for mobility between LTE and other 3GPP technologies. SGW 118 may further be in communication with PGW 120/PCEF 130.

PGW 120/PCEF 130 may provide Internet protocol (IP) connectivity access network (IP-CAN) session connectivity for UEs to external packet data networks, such as, for example, packet network(s) 150 as providing session connectivity for UE service data flows (SDFs) to TDF 122. PGW 120 and PCEF 130 may serve as policy and charging enforcement points to manage QoS, online/offline flow-based charging, data generation, deep-packet inspection and intercept. PGW 120/PCEF 130 may further be in communication with PCRF 116 and TDF 122. In certain embodiments, PGW 120/PCEF 130 can interface directly with a given PDN without intermediation via TDF 122. In various embodiments, TDF can provide services for user equipment service data flows (SDFs), such as, for example, gating, redirection, bandwidth limitations, combinations thereof or the like as described in 3GPP TS 29.212. In general, charging for IP-CAN bearer session can relate to data volumes sent to and/or received by a given UE. Charging for the IP-CAN bearer session can be further enhanced, at least in part, by categorizing SDFs within the IP-CAN bearer traffic as described in 3GPP TS 23.203, TS 32.251, etc. In general, an SDF can correspond to services, applications, etc., which can be provided to a user/UE (e.g., to enhance user experience) and are typically identified using 5-tuple parameters contained in a Flow-Description Attribute Value Pair (AVP).

In various embodiments, PCRF 116 may aggregate information to and from communication system 100, operational support systems, such as, for example, RAN OAM system 142, RCAF 144 and/or AF 114, and other sources (such as portals) in real time, supporting the creation of policy and charging rules and then automatically making policy and charging decisions for each subscriber. PCRF 116 can be configured to use user subscription information as a basis for the policy and charging control decisions. The subscription information may apply for both session-based and non-session based services. PCRF 114 may provision policy charging and control (PCC) rules for PGW 120/PCEF 130. Additionally, PCRF 116 may determine PCC rules based on an application or service described to the PCRF, for example, from AF 114, which can be provisioned by a network operator. In various embodiments, PCRF 116 may communicate PCC rules to PGW 120/PCEF 130 via the Gx interface and/or TDF 122 via the Sd interface. In various embodiments, RCAF 144 may report RAN User Plane Congestion Information (RUCI), or, more generally, congestion information, to PCRF 116 so that it may make policy decisions for users based on one or more of RAN congestion information, cell congestion information, IP-CAN charging, SDF charging, etc.

In general, a DRA (e.g., DRA 148) can select a PCRF for each device (e.g., UE) session and can proxy traffic on a per-DIAMETER session basis for each user session. In essence, DRA 148 can provide a proxy for communicating policy and charging information between multiple clients (e.g., RCAF 144, PCRF 116, PGW 120/PCEF 130, TDF 122, AF 114, etc.) in communication system 100.

In various embodiments, AF 114 can describe applications/services to PCRF 116 (e.g., via Information Elements (IEs) such as, for example, media type and media description, priority, uplink/downlink requirements, application identifier, etc.) that may require dynamic policy and/or charging control for UE 112. The dynamic policy and/or charging controls may include, but not be limited to, setting quality of service (QoS) levels and/or gating. In certain embodiments, various network access and application services can be provided for UE 112 by establishing a corresponding session for UE 112 via AF 114.

In various embodiments, charging system 126 can include an OCS, which may provide online credit control rules/functions and/or OFCS, which may provide offline credit control rules/functions for one or more subscribers within communication system 100. In various embodiments, an OCS and/or an OFCS may enable a service provider to manage services and/or application charging/rating rules/functions across all access types, device types and/or subscribers for communications system 100. It should be understood that charging system 126 can include multiple OCSs and/or OFCSs provisioned within communication system 100.

In various embodiments, SPR 128 can contain subscriber/subscription related information needed for subscription-based policies, IP-CAN bearer level PCC rules and/or SDF level PCC rules, which can be implemented by PCRF 116. In some embodiments, SPR 128 may be combined with or distributed across other databases in communication system 10. In some embodiments, SPR 128 can also provide subscription profile information for one or more packet data networks (e.g., packet network(s) 150), which may include, but not be limited to a subscriber's allowed services; information on a subscriber's allowed QoS; a subscriber's charging related information (e.g., location information relevant for charging); and a subscriber category. In some embodiments, SPR 128 can be combined with and/or provided in conjunction with a user data repository (UDR), which can be used to store user information, that may be separate and/or distinct from subscription and charging data, such as, for example, user behavior data, configurable user preferences, demographic information, etc.

In various embodiments, each of AF 114, PCRF 116, PGW 120/PCEF 130, TDF 122, MME 124, SPR 128 and/or RCAF 144 as well as other elements of communication system 100 can be enhanced to provide deferred delivery of content based on congestion as described in further detail herein in this Specification.

Before detailing some of the operational aspects of FIG. 1, it is important to understand common characteristics of content delivery as generally provided in commercial architectures. The following foundation is offered earnestly for teaching purposes only and, therefore should not be construed in any way to limit the broad teachings of the present disclosure. In some cases, user data traffic can include pushed data, for example, data pushed from the operator or a 3rd Party to applications residing on UEs on the operator's network. Pushed data can take many forms, such as, for example, application (app) notifications from push platforms such as Apple's Push Notification Service or Google's Cloud Messaging system; delivery of media content from operator owned or 3rd party platforms; software updates, etc.

In some cases, under RAN user-plane congestion, service providers may elect to defer delivery of certain services, e.g. less time-sensitive traffic, to a later time when the network load is lower. In current deployments, if an operator wants to limit such data during user-plane congestion events, the operator can block such data transfers (e.g., on the PGW or the TDF). In response, the push infrastructure will attempt to retry at some later time, but clearly it does not have any information about the congestion event, and to what value an appropriate retry timer should be set. As a result the retry timer could either be set to a very short interval, thereby increasing signaling resource impacts for both the push platform provided (e.g., a 3rd Party) and the network operator, or could be set to a long interval. In the latter case, either the cell that the UE is in could come out of congestion, or the UE could move to a cell that is not congested. In either case the data delivery is unnecessarily delayed.

In accordance with various embodiments described herein, communication system 100 is configured to provide a system and method for providing deferred delivery of content based on congestion in a network environment. In at least one embodiment, the method described herein can be executed by one or more hardware processors for an AF (e.g., AF 114), a PCRF (e.g., PCRF 116), an SGW (e.g., SGW 118), a PGW/PCEF (e.g., PGW 120/PCEF 130), an MME (e.g., MME 124), a TDF (e.g., TDF 122), a charging system (e.g., charging system 126), an SPR (e.g., SPR 128), a RAN OAM system (e.g., RAN OAM system 142) and/or an RCAF (e.g., RCAF 144). Generally, the system and method provided by communication system 100 may enable RAN-aware time shifted content delivery to enable a service provider to deliver managed content to a user at times and/or locations when and/or where the network is uncongested. In various embodiments, content, as referred to herein in this Specification can include, but not be limited to data, pictures, audio, video; services associated with data, pictures, audio, video, multi-media sessions; combinations thereof or the like. In essence, the system and method provided by communication system 100 can leverage RAN congestion awareness in order to enable service providers the ability to monetize their excess capacity and/or encourage users to accept delayed delivery via charging incentives.

For monetizing and/or incentivizing consider, for example, a Service Provider (SP) offering 3rd party/Over-the-Top (OTT) services to their users. In some cases, the SP and the OTT operator may have service level agreements (SLAs) with regards to the sponsors, QoS, charging, revenue sharing, maximum number of simultaneous connections, etc. In still other cases, the SP may provide incentives to 3rd party/OTT operators to accept differed delivery of content when the network is under congestion. Another example might include a SP offering incentives to individual subscribers to defer delivery of content for certain applications when the network is under congestion.

In various embodiments, the system and method provided by communication system 100 may provide for the provisioning of new information elements (IEs), which can be communicated over policy management signaling interfaces to enable identification of the deferred content by an Application Server (e.g., AF 114), PCRF 116, PGW 120/PCEF 130 and/or charging system 126 (e.g., OCS, OFCS).

In various embodiments, the IEs could include input data for an OTT/3rd party application received over the interface between PCRF 116 and an (OTT/SP) application domain (e.g., between PCRF 116 and AF 114); input data for a subscriber over the interface between PCRF 116 and SPR 128 (and/or a UDR); and/or input data related to RAN congestion information received over the interface between PCRF 116 and RCAF 144, or in some embodiments, received over an interface between PCRF and a Self-Organizing Network (SON) system. In various embodiments, one or more OTT/3rd Party application domain IE(s) can include, but not be limited to, an OTT priority, an Application-identifier (Application-ID), and a DeferredDelivery-Indication (DeferredDelivery-Indication) Attribute Value Pair (AVP). As discussed in further detail below, the DeferredDelivery-Indication can provided as an explicit indication to charging system 126 to set charging information for the user and/or provider of the content electing deferred content delivery.

In various embodiments, one or more SPR/UDR IE(s) can include, but not be limited to, an OTT provider profile and an extended subscriber QoS profile. In certain embodiments, information that can be included in an OTT provider profile and/or an extended subscriber QoS profile can include, but not be limited to, support for deferred service delivery, applications and/or types of applications that are deferrable, SLA in terms of total session and/or volume, support for sponsored data connectivity, combinations thereof or the like. In various embodiments, one or more RAN congestion information IE(s) can include, but not be limited to, RAN congestion level, cell congestion level, RAN measurements, cell measurements, combinations thereof or the like.

During operation, for example, PCRF 116 may become aware that one or more users are in a congested cell or environment. In various embodiments, congestion (e.g., UPCON) can be detected for one or more cell(s) and/or environments (e.g., a building including a small cell network, etc.) within RAN 140. In various embodiments, congestion detection can be provided using various network elements and/or systems (e.g., RAN OAM system 142, RCAF 144, PCRF 116, etc.) and can, for example, be based on cell/RAN monitoring and/or measuring, network monitoring, network analytics, combinations thereof or the like.

In various embodiments, congestion could be detected via RCAF 144, which may receive cell-ID(s), cell measurements, etc. from RAN OAM system 142. As referred to herein in this Specification, such cell-ID(s), cell measurements, etc. can be referred to collectively using the term 'congestion measurement information', which generally may generally refer to RAN-related congestion. In some embodiments, RAN OAM system 142 may output congestion measurement information from RAN 140 either directly or indirectly. By directly it is meant that RAN OAM system 142 may output congestion measurement information collected from directly from RAN 140 and by indirectly, it is meant that RAN OAM system 142 may receive RAN outputs via a SON system and/or a Quantum SON (QSON®) system, as marketed by Cisco Systems, Inc, which may receive inputs from a variety of sources including, but not limited to, one or more network monitoring mechanisms/techniques, RAN OAM system 142, etc. to determine cell load.

In various embodiments, network monitoring mechanisms/techniques can include, for example, various types of network 'probes' (e.g., inline, passive, hardware-based, software-based, etc.), which may infer congestion using one or more techniques, such as, for example, packet round trip times (RTTs) and/or jitter, transmission control protocol (TCP) behavior, etc. In various embodiments, network monitoring mechanisms/techniques can include using inline proxies (e.g., similar to a transparent proxy used for video optimization) that can infer from content delivery that a user is experiencing congestion and/or possibly poor RF conditions. In various embodiments, congestion could also be detected based on device measurements, individually or 'crowd sourced' (e.g., from multiple devices). In various embodiments, detection sensing could be based upon measurements that are approximately 'real-time', that have some approximate latency, and/or could be based upon prior patterns or models. These examples are just a few of the many processes, devices, systems, etc. that could be used to detect congestion. It should be understood that congestion could be detected using a variety of other processes, devices, systems, etc. within the scope of the present disclosure.

Consider for the present operational example that RCAF 144 may collect per cell congestion measurement information from RAN OAM system 142. Via the Nq interface, RCAF 144 may request from MME 124 a list of one or more UE(s) (e.g., identified by IMSI) per cell-ID for one or more congested cells and a list of active access point names (APNs) (e.g., packet data network identifier) per UE for which each of the UE have an active session associated therewith. MME may respond with the list of IMSIs and APNs in the congested cell(s) corresponding to the cell-ID(s) received from RCAF 144. Based on the response, RCAF 144 may determine a serving PCRF (e.g., PCRF 116) per IMSI/APN and may report congestion information (e.g., RUCI) over the Np interface to PCRF 116. In various embodiments, the serving PCRF can be determined using DRA 148. As described in 3GPP TS 23.203, a DRA can include binding information linking, for example, IMSI, APN, and UE IP address for one or more UE to a PCRF-ID allocated to the UE when a Gx session is established. In various embodiments, any of AF 114, PGW 120/PCEF 130, TDF 122 and/or RCAF can access the DRA to determine the PCRF that is handling the Gx session for a given UE. Each client can provide an input parameter to the DRA that it has at its disposal to determine the PCRF that is handling the Gx session for a given UE. For example, AF 114 can provide a UE IP address to the DRA to determine a PCRF handling the Gx session for the UE while RCAF 144 can provide an {IMSI, APN} pair for the UE to the DRA to determine a PCRF handling the Gx session for the UE.

In various embodiments, the congestion information communicated from RCAF 144 can include, but not be limited to cell congestion level for one or more cell(s), and a list of one or more affected UE(s) (e.g., IMSI(s)) in the affected cell(s). As referred to herein in this Specification, the term 'congestion information' may refer to RAN-related information which additionally includes user/UE-centric information (e.g., identifying user(s)/UE that are operating in congested environments).

In the present example, it is assumed that the congestion information includes the congestion level for cell 146a and an IMSI identifying UE 112. Based on the congestion information received from RCAF 144, PCRF 116 may determine that UE 112 is in a congested cell (e.g., cell 146a) and may perform one or more processes to mitigate the congestion and/or modify and/or adapt the policies of existing connections for each user (e.g., user associated with UE 12) in a congested cell (e.g., cell 146a) based, at least in part, on the congestion level, the user profile, current usage, current services, etc. In one or more embodiments, such processes can include, but not be limited to, activating compression (e.g., for video services), deferring services, changing bitrates, changing QoS, combinations thereof or the like.

At any time, AF 114 may initiate a connection via the Rx interface with PCRF 116 and may request authorization of QoS resources for an SDF associated with delivery of content to UE 112 (e.g., an SDF for an OTT/3rd party service, application, etc.). Based on the request, PCRF 116 may determine that UE 112 is in a congested cell (e.g., cell 146a) and may determine that delivery of the content will be deferred. Upon determining deferred delivery of the content, PCRF 116 may determine a re-try interval for a re-try timer for AF 114, which can be used to defer delivery of the content. In various embodiments, determination of the re-try interval can be based, at least in part, on RAN congestion level (e.g., considered as an aggregate of congestion for multiple cells); on the cell congestion level reported by RCAF 144; on user profile information; on current usage for the user, on statistical data accessed by PCRF 116; and/or on various analytics, which can be used to optimize deferred delivery. In various embodiments, analytics for optimizing deferred delivery can include considering patterns and/or predictions about the network state as well as about the user, such as, for example, their patterns, predictions, statistics, etc. that might indicate that the user might be at certain network locations (e.g., home, work, etc.) and/or network connectivity levels in the future. Accordingly, many factors can be considered in order to determine the re-try interval.

PCRF 116 may also derive a deferred content identifier (e.g., DeferredContent-ID), which may identify the content and/or an SDF (e.g., Flow-Description AVP) associated with the content that has been deferred. In various embodiments, the DeferredContent-ID can be derived in a random manner or can be based on one or more factors, such as, for example, service, application, provider, user identifier (e.g., IMSI), cell-ID, subscription profile of user, user profile information (e.g., gathered from a UDR), user location, congestion level, combinations thereof or the like. PCRF may communicate the re-try interval and the DeferredContent-ID to AF 114 via the Rx interface. Upon receiving the response from PCRF 116, AF 114 may defer delivery of the content until expiry of the re-try timer, at which time AF 114 may communicate a request to PCRF 116 via the Rx interface for delivery of the deferred content. When AF 114 initiates delivery of the deferred content upon expiration of the re-try interval it can include the DeferredContent-ID in the connection request along with the Flow-Description AVP (e.g., SDF 5-tuple) identifying the SDF associated with the content.

For proper handling of requests for deferred content delivery, PCRF 116 can be configured to "remember" or collect key information elements associated with the SDF, such as, for example, the SDF 5-tuple (Flow-Description AVP), the re-try interval and the DeferredContent-ID. In certain embodiments, PCRF 116 may store the SDF 5-tuple, the re-try interval and the DeferredContent-ID in PCRF 116 storage. In certain embodiments, PCRF 116 may communicate the SDF 5-tuple, the re-try interval and the Deferred-Content-ID to SPR 128 via the Sp interface for storage in SPR along with other subscription information for the user associated with UE 112.

Upon receiving the request, PCRF 116 can retrieve (e.g., either from storage within PCRF 116 or from SPR 128) the stored re-try interval for the content/SDF using the DeferredContent-ID received from AF 114. The stored re-try interval can be retrieved to verify that the content was indeed deferred previously (e.g., to ensure proper charging of deferred content) and also to verify that the request for delivery of the deferred content has not been received before expiration of the re-try interval. In certain embodiments, the check for expiration of the re-try interval can be based on one or more timers configured for PCRF 116 based on the re-try interval determined for the deferred delivery, comparison of time stamps associated with received requests or some other comparative or time determination technique.

If it is determined that a request for delivery of deferred content is received from AF 114 prior to expiration of the re-try interval, PCRF 116 may ignore the request. In various embodiments, PCRF 116 can also match the DeferredContent-ID and the Flow-Description AVP received in the AF request to the stored values for further verification that the content was previously deferred. However, if PCRF 116 determines that the re-try interval has expired, PCRF 116 may provision one or more policy (e.g., PCC) rule(s) for the SDF at PGW 120/PCEF 130 via the Gx interface and/or may provision one or more policy rules for the SDF at TDF 122 via the Sd interface. In various embodiments, the PCC rule(s) can include a charging-key for the SDF and the DeferredDelivery-Indication AVP.

When the SDF of the deferred content (or, more generally, the deferred service) terminates, PGW 120/PCEF 130 and/or TDF 122 can communicate the DeferredDelivery-Indication to charging system 126 via their respective Gy and/or Gz interfaces to ensure proper billing for the deferred content/service. For example, PGW 120/PCEF 130 can communicate the DeferredDelivery-Indication to an OCS via the Gy interface and/or to an OFCS via the Gz interface. Similarly, TDF 122 can communicate the DeferredDelivery-Indication to an OCS via the Gy interface and/or to an OFCS via the Gz interface. The DeferredDelivery-Indication provides an explicit indication to charging system 126 that content has been deferred to set proper charging (e.g., to encourage customers to accept deferred delivery of content). In various embodiments, the OCS can provision credit-rules at PGW 120/PCEF 130, which take into account the DeferredDelivery-Indication to determine proper charging for the customer(s) (e.g., user(s), 3rd party/OTT operator(s) of the service/application, combinations thereof or the like). As used herein in this Specification, the terms 'terminate' and 'termination' may be used to reference termination of an SDF associated with certain deferred content, however, it should be understood that termination of an SDF does not necessarily imply termination of a connection for a given UE, as one or more other SDFs, bearers, etc. for the UE may still be active for the UE connection with PGW 120/PCEF 130 and/or TDF 122.

Accordingly, the system and method provided by communication system 10 may integrate into many deployments where the OCS interface is required for both pre-paid and post-paid users. In various embodiments, PGW 120/PCEF 130 can also include the DeferredDelivery-Indication in the charging data record (CDR) for the user.

In some embodiments a different charging-key and/or service-ID could be used to identify the SDF instead of the DeferredDelivery-Indication. However, operators generally try to keep the number of charging-keys low. If a different charging-key/service-ID is configured for every type of service that may be deferred the number of different keys/IDs to be handled by the OCS/OFCS (and the PCRF) would significantly increase. Having an explicit indication of deferred delivery content avoids increasing the number of keys/IDs needed for the system.

Accordingly, the system and method provided by communication system 100 can leverage RAN congestion awareness in order to enable service providers the ability to monetize their excess capacity and/or encourage users to accept delayed delivery via charging incentives.

Figure 2:
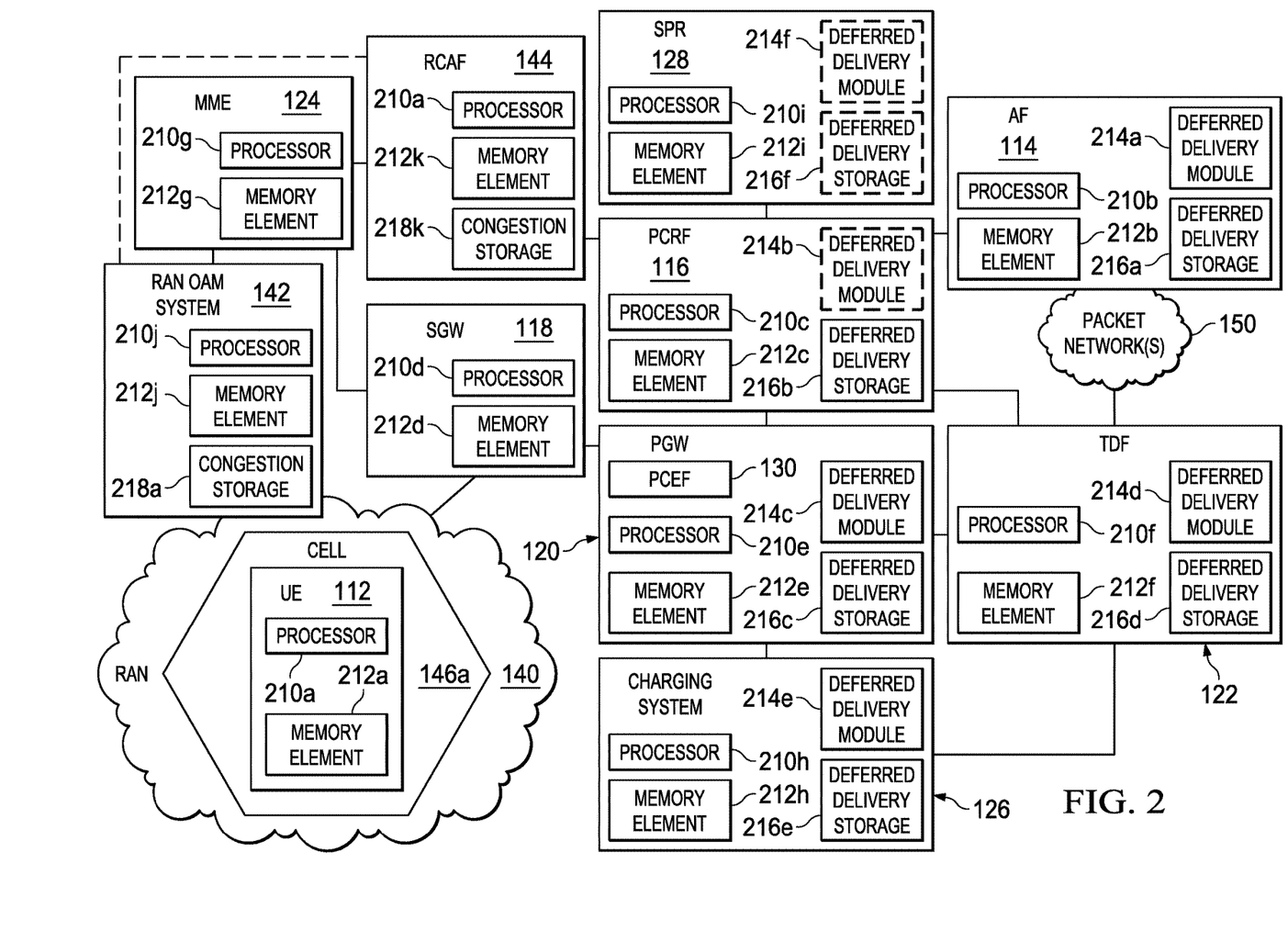
FIG. 2 is a simplified block diagram illustrating additional details associated with one potential embodiment of the communication system.

Turning to FIG. 2, FIG. 2 is a simplified block diagram illustrating additional details associated with one potential embodiment of the communication system. FIG. 2 includes UE 112, AF 114, PCRF 116, SGW 118, PGW 120, TDF 122, MME 124, charging system 126, SPR 128, RAN OAM system 142 and RCAF 144. Also shown in FIG. 2 are RAN 140, cell 146*a* and packet network(s) 150. Each of respective UE 112, AF 114, PCRF 116, SGW 118, PGW 120, TDF 122, MME 124, charging system 126, SPR 128, RAN OAM system 142 and RCAF 144 may each include a respective processor 210*a*-210*k* and a respective memory element 212*a*-212*k*. Although not shown in FIG. 2, it should be understood that DRA 148 can also include a corresponding memory element and processor.

AF 114 may additionally include a deferred delivery module 214*a*, which may be configured to implement various deferred content delivery functions as described herein for AF 114. AF 114 may additionally include deferred delivery storage 216*a*, which may be configured to store, at least in part, a deferred content identifier (e.g., DeferredContent-ID) for given deferred content, a re-try interval indicating an amount of time to defer a subsequent request to deliver the deferred content and SDF information for an SDF associated with the deferred content. PCRF 116 may additionally include a deferred delivery module 214*b*, which may be configured to implement various deferred content delivery functions as described herein for PCRF 116. In various embodiments, PCRF 116 may additionally include a deferred delivery storage 216*b*, which may be configured to store, at least in part, a deferred content identifier (e.g., DeferredContent-ID) for given deferred content, a re-try interval indicating an amount of time to defer a subsequent request to deliver the deferred content, a deferred delivery indication (e.g., DeferredDelivery-Indication AVP) for the deferred content and SDF information for an SDF associated with the deferred content. In such embodiments, PCRF 116 may be configured to store such information rather than offload this information to SPR 128.

PGW 120 may additionally include a deferred delivery module 214*c*, which may be configured to implement various deferred content delivery functions as described herein for PGW 120/PCEF 130. PGW 120 may additionally include a deferred delivery storage 216*c*, which may be configured to store, at least in part, a deferred delivery indication (e.g., DeferredDelivery-Indication AVP) for given deferred content and/or SDF information for the deferred content. TDF 122 may additionally include a deferred delivery module 214*d*, which may be configured to implement various deferred content delivery function as described herein for TDF 122. TDF 122 may additionally include a deferred delivery storage 216*d*, which may be configured to store, at least in part, a deferred delivery indication (e.g., DeferredDelivery-Indication AVP) for given deferred content and/or SDF information for the deferred content.

Charging system 126 (e.g., an OCS and/or an OFCS) may additionally include a deferred delivery module 214*e*, which may be configured to implement various deferred content delivery functions as describe herein for charging system 126. Charging system 126 may additionally include a deferred delivery storage 216*e*, which may be configured to store, at least in part, a deferred delivery indication (e.g., DeferredDelivery-Indication AVP) for given deferred content and/or SDF information for the deferred content. In various embodiments, SPR 128 may additionally include a deferred delivery module 214*f*, which may be configured to implement various deferred content delivery functions as described herein for SPR 128 and may be configured to include a deferred delivery storage 216*f*, which may be configured to store, at least in part, a deferred content identifier (e.g., DeferredContent-ID) for a given deferred content, a re-try interval indicating an amount of time to defer a subsequent request to deliver the deferred content and SDF information for an SDF associated with the deferred content For example, SPR 128 may be configured to store such information instead of and/or in addition to such storage in PCRF 116.

RAN OAM system 142 may additionally include a congestion storage 218*a* and RCAF 144 may additionally include a congestion storage 218*b*, each of which may be configured to congestion measurement information, user-centric congestion information (e.g., RUCI) associated with one or more cell(s) (e.g., cells 146*a*-146*c*) of RAN 140 and user(s) operating within those cell(s) and/or any other congestion-related information for communication system 100.

Hence, appropriate software and/or hardware is being provisioned in UE 112, AF 114, PCRF 116, SGW 118, PGW 120, TDF 122, MME 124, charging system 126, SPR 128, RAN OAM system 142, RCAF 144 and DRA 148 in order to facilitate deferred delivery of content using the system and method provided by communication system 100. Note that in certain examples, certain storage can be consolidated with memory elements (or vice versa), or the storage can overlap/exist in any other suitable manner.

In one example implementation, UE 112, AF 114, PCRF 116, SGW 118, PGW 120, TDF 122, MME 124, charging system 126, SPR 128, RAN OAM system 142, RCAF 144 and DRA 148 are network elements, which are meant to encompass network appliances, servers, routers, switches, gateways, bridges, loadbalancers, firewalls, processors, modules, or any other suitable device, component, element, or object operable to exchange information that facilitates or otherwise helps coordinate and/or manage deferred content delivery activities (e.g., for networks such as those illustrated in FIG. 1, etc.). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In regards to the internal structure associated with communication system 100, each of UE 112, AF 114, PCRF 116, SGW 118, PGW 120, TDF 122, MME 124, charging system 126, SPR 128, RAN OAM system 142, RCAF 144 and DRA 148 can include a memory element (e.g., respective memory element 212*a*-212*k*) for storing information to be used in achieving the deferred content delivery operations, as outlined herein. Additionally, each of these devices may include a hardware processor (e.g., respective processor 210*a*-210*k*) that can execute software or an algorithm to perform the deferred content delivery activities as discussed in this Specification. These devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. The information being tracked or sent to UE 112, AF 114, PCRF 116, SGW 118, PGW 120, TDF 122, MME 124, charging system 126, SPR 128, RAN OAM system 142, RCAF 144 and DRA 148 could be provided in any database, register, control list, cache, or storage structure: all of which can be referenced at any suitable timeframe. Any such storage options may be included within the broad term 'memory element' as used herein. Similarly, any of the potential processing elements, modules, hardware and machines described herein should be construed as being encompassed within the broad term 'processor'. Each of the network elements and user equipment (e.g., mobile nodes) can also include suitable interfaces for receiving, transmitting, and/or otherwise communicating data or information in a network environment.

Note that in certain example implementations, the deferred content delivery operations as outlined herein may be implemented by logic encoded in one or more tangible media, which may be inclusive of non-transitory media (e.g., embedded logic provided in an ASIC, in digital signal processor (DSP) instructions, software [potentially inclusive of object code and source code] to be executed by a processor, or other similar machine, etc.). In some of these instances, memory elements [as shown in FIG. 2] can store data used for the operations described herein. This includes the memory elements being able to store software, logic, code, or processor instructions that are executed to carry out the activities described herein. A processor, including a hardware processor, can execute any type of instructions associated with the data to achieve the operations detailed herein. In one example, the processors [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, an electrically erasable programmable read only memory (EEPROM)) or an ASIC that includes digital logic, software, code, electronic instructions, or any suitable combination thereof.

Figure 3:
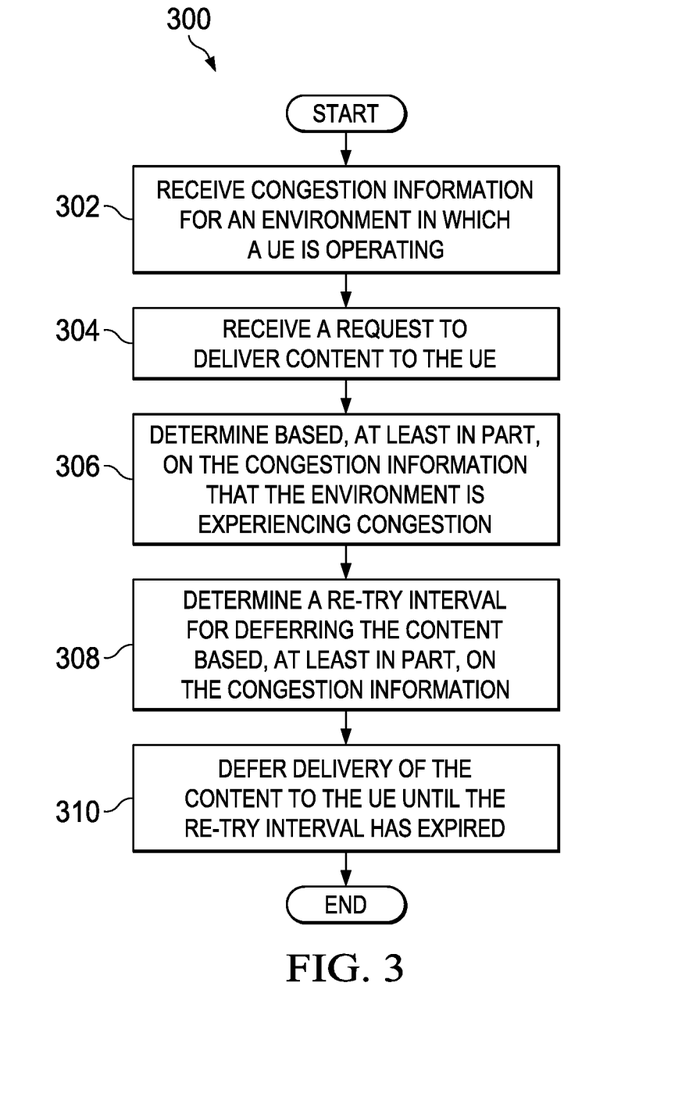
FIG. 3 is a simplified flow diagram illustrating example operations associated with providing deferred delivery of content based on congestion in a network environment in accordance with one potential embodiment of the communication system.

Turning to FIG. 3, FIG. 3 is a simplified flow diagram illustrating example operations 300 associated with deferred content delivery in a network environment in accordance with one potential embodiment of communication system 100. In various embodiments, the operations can be performed by AF 114, PCRF 116, PGW 120/PCEF 130, TDF 122, MME 124, charging system 126, SPR 128, RAN OAM system 142, RCAF 144 and/or DRA 148, which can be provisioned in communication system 100.

At any time, congestion may be detected for an environment (e.g., a cell, a set of cells, a RAN, etc.) including a given UE (e.g., UE 112). Accordingly, the operations may begin at 302 in which a given PCRF (e.g., PCRF 116) may receive congestion information for an environment in which a given UE (e.g., UE 112) is operating. In various embodiments, the congestion information may be RUCI and may include one or more congestion levels for a cell (e.g., cell 146a), a group of cells, a RAN (e.g., RAN 140), etc. in which the UE may be operating. At 304, the PCRF may receive a request to deliver content to the UE. At 306, the PCRF determines based, at least in part on the congestion information, that the environment in which the UE is operating is experiencing congestion. At 308, the PCRF determines a re-try interval for deferring the content based, at least in part on the congestion information. In various embodiments, the re-try interval can additionally be based, at least in part, on a subscription profile of a user associated with the UE; a user profile of a user associated with the UE; information associated with the content; information associated with a provider of the content; current usage in the environment; combinations thereof or the like. At 310, delivery of the content to the UE is deferred until the re-try interval has expired and the operations may end. Accordingly, communication system 100 can be used to defer delivery of content based on congestion in an environment using various operations as described herein in this Specification.

Figure 4:
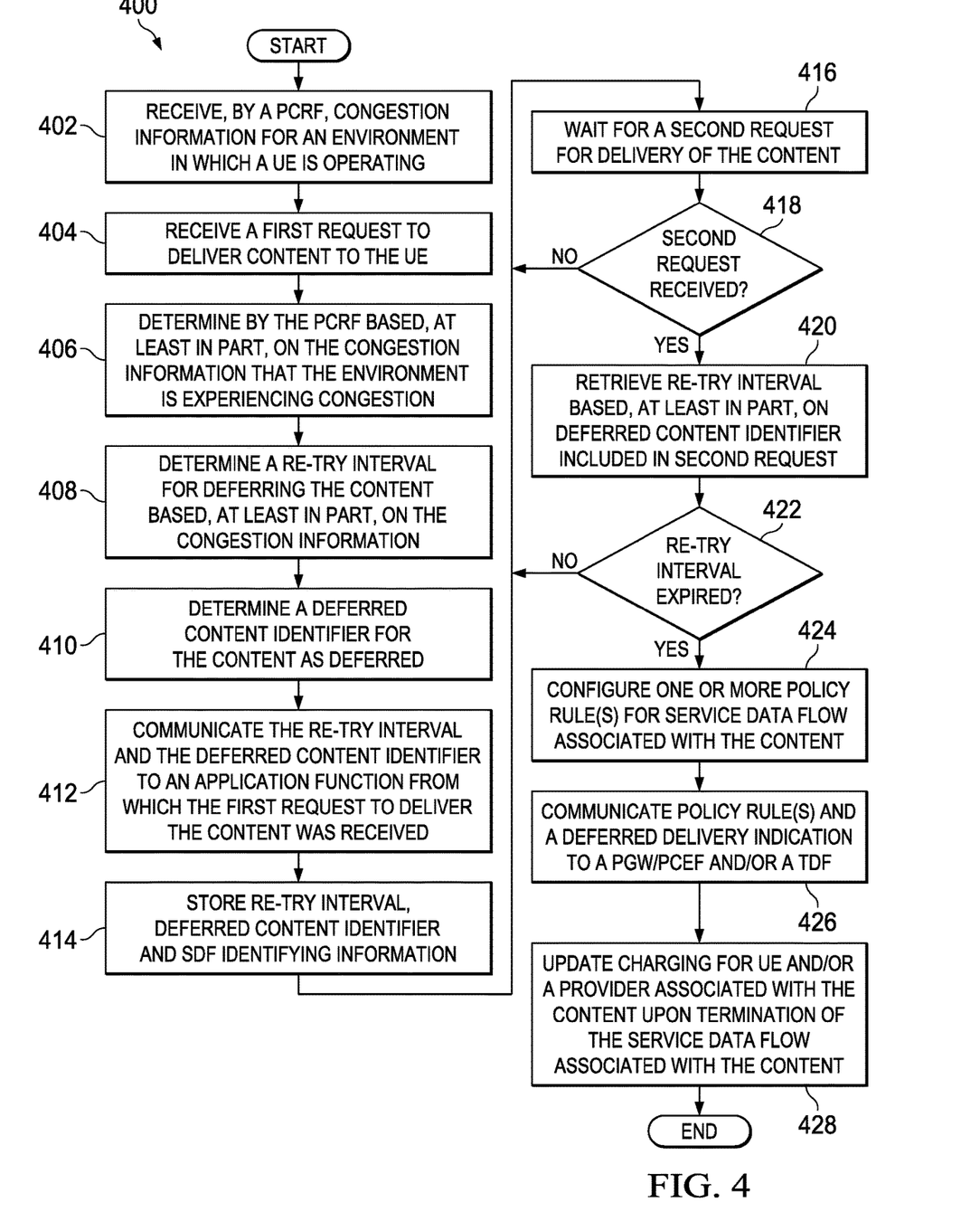
FIG. 4 is a simplified flow diagram illustrating other example operations associated with providing deferred delivery of content based on congestion in a network environment in accordance with one potential embodiment of the communication system.

Turning to FIG. 4, FIG. 4 is a simplified flow diagram illustrating other example operations 400 associated with deferred content delivery in a network environment in accordance with one potential embodiment of communication system 100. In various embodiments, the operations can be performed by AF 114, PCRF 116, PGW 120/PCEF 130, TDF 122, MME 124, charging system 126, SPR 128, RAN OAM system 142, RCAF 144 and/or DRA 148, which can be provisioned in communication system 100.

At any time, congestion may be detected for an environment (e.g., a cell, a set of cells, a RAN, etc.) including a given UE (e.g., UE 112). Accordingly, the operations may begin at 402 in which a given PCRF (e.g., PCRF 116) may receive congestion information for an environment in which a given UE (e.g., UE 112) is operating. In various embodiments, the congestion information may be RUCI and may include one or more congestion levels for a cell (e.g., cell 146a), a group of cells, a RAN (e.g., RAN 140), etc. in which the UE may be operating. At 404, the PCRF may receive a first request to deliver content to the UE. At 406, the PCRF determines based, at least in part, on the congestion information, that the environment is experiencing congestion.

At 408, the PCRF determines a re-try interval for deferring the content based, at least in part, on the congestion information. In various embodiments, the re-try interval can additionally be based, at least in part, on a subscription profile of a user associated with the UE; a user profile of a user associated with the UE; information associated with the content; information associated with a provider of the content; current usage in the environment; combinations thereof or the like. At 410, the PCRF determines a deferred content identifier (e.g., DeferredContent-ID) for identifying the content as deferred. At 412, the PCRF communicates the re-try interval and the deferred content identifier to an Application Function (e.g., AF 114) from which the first request to deliver the content was received.

At 414, the re-try interval, the deferred content identifier and SDF identifying information (e.g., Flow-Description AVP, SDF 5-tuple) identifying a SDF associated with the content are stored. In certain embodiments, the re-try interval, the deferred content identifier and the SDF identifying information can be communicated to and stored in storage of an SPR (e.g., SPR 128). In certain embodiments, the re-try interval, the deferred content identifier and the SDF identifying information can be stored in storage of the PCRF.

At 416, the PCRF may wait for a second request for delivery of the content from the AF. The PCRF may continue to wait for the second request, as shown at 418, until the second request is received. If a second request to deliver the content is received, the operations may continue to 420 in which the PCRF may retrieve the re-try interval for the content based on the deferred content identifier included in the second request. In various embodiments, the PCRF can retrieve the re-try interval, along with any other information associated with the content (e.g., SDF identifying information, etc.) from storage within the SPR or the PCRF.

At 422, the PCRF can determine if the re-try interval for the content has expired. If the PCRF determines that the re-try interval for the content has not expired, the operations may ignore the request and return to 416 to continue to wait for a valid second request from the AF. However, if the PCRF determines at 422 that the re-try interval has expired, the operations can continue to 424 in which the PCRF can configure one or more policy rule(s) (e.g., PCC rules) for the SDF associated with the content.

At 426, the PCRF can communicate the one or more policy rule(s) and a deferred delivery indication (e.g., DeferredDelivery-Indication) to at least one of a PGW/

PCEF (e.g., PGW 120/PCEF 130) and/or a TDF (e.g., TDF 122). In various embodiments, the deferred delivery indication can be used to set charging for a user and/or provider associated with the content. Accordingly, at 428 the PGW/PCEF and/or the TDF can update charging for the UE and/or the provider associated with the content upon termination of the service data flow (e.g., termination of the service data flow at the PGW/PCEF and/or the TDF) associated with the content and the operations may end for the particular content. Accordingly, communication system 100 can be used to defer delivery of content based on congestion in an environment and/or to ensure proper billing for the deferred content using various operations as described herein in this Specification.

Figure 5:
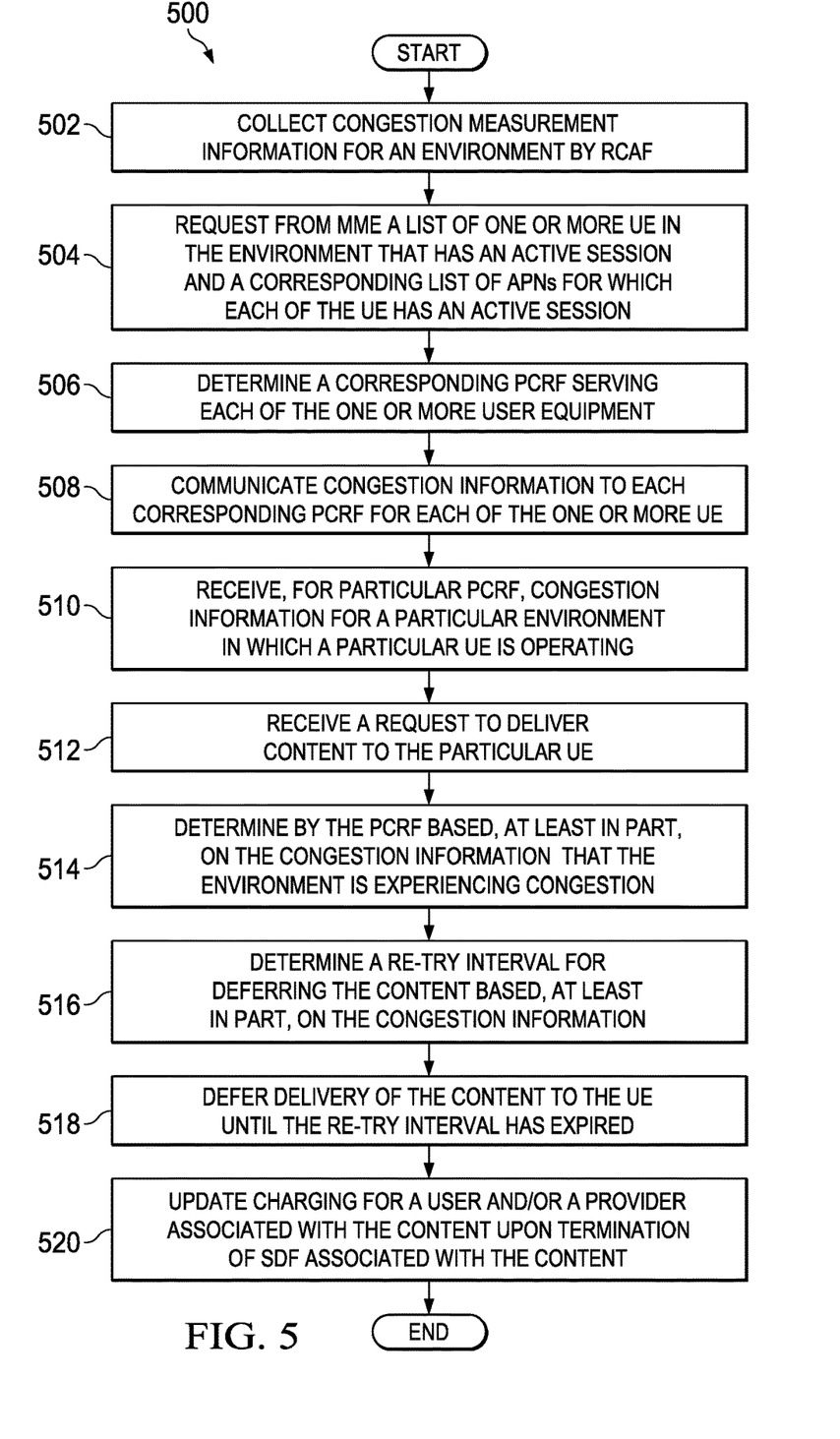
FIG. 5 is a simplified flow diagram illustrating yet other example operations associated with providing deferred delivery of content based on congestion in a network environment in accordance with one potential embodiment of the communication system

Turning to FIG. 5, FIG. 5 is a simplified flow diagram illustrating other example operations 500 associated with deferred content delivery in a network environment in accordance with one potential embodiment of communication system 100. In various embodiments, the operations can be performed by AF 114, PCRF 116, PGW 120/PCEF 130, TDF 122, MME 124, charging system 126, SPR 128, RAN OAM system 142, RCAF 144 and/or DRA 148, which can be provisioned in communication system 100.

At 502, an RCAF (e.g., RCAF 144) can collect congestion measurement information for an environment (e.g., a cell, a set of cells, a RAN, etc.). In various embodiments, the congestion measurement information can include one or more cell-ID(s) for one or more cell(s) experiencing congestion and the corresponding congestion measurements (e.g., levels) for those one or more cell(s). At 504, the RCAF can request from an MME (e.g., MME 124) a list of one or more UE in the environment that have an active session and a corresponding list of APNs for which each UE has an active session. In various embodiments, the list of UE can be identified by a corresponding IMSI associated with each UE. At 506, the RCAF can determine a corresponding PCRF serving each of the one or more UE. In certain embodiments, the RCAF can determine each corresponding PCRF serving each UE via a DRA (e.g., DRA 148) available within communication system 100. At 508, the RCAF can communicate congestion information (e.g., congestion level, list of IMSIs) to each corresponding PCRF for each of the one or more UE.

The remaining operations for FIG. 5 are described with respect to a particular PCRF (e.g., PCRF 116), which may have an active session for a particular UE. At 510, the particular PCRF receives the congestion information for a particular environment (e.g., a particular cell, group of cells, RAN, etc.) in which a particular UE is operating. At 512, the PCRF may receive a request to deliver content to the UE. At 514, the PCRF determines based, at least in part, on the congestion information that the environment in which the UE is operating is experiencing congestion. At 516, the PCRF determines a re-try interval for deferring the content based, at least in part on the congestion information. In various embodiments, the re-try interval can additionally be based, at least in part, on a subscription profile of a user associated with the UE; a user profile of a user associated with the UE; information associated with the content; information associated with a provider of the content; current usage in the environment; combinations thereof or the like. At 518, delivery of the content to the UE is deferred until the re-try interval has expired.

At 520, charging for a user and/or a provider associated with the content can be updated upon termination of an SDF associated with the content and the operations may end. In various embodiments, the updating can be initiated by a PGW/PCEF (e.g., PGW 120/PCEF 130) and/or a TDF (e.g., TDF 122) and can be updated for a charging system such as, for example, an OCS and/or an OFCS. Accordingly, communication system 100 can be used to detect congestion in an environment, to defer delivery of content based on the congestion and/or to ensure proper billing for the deferred content using various operations as described herein in this Specification.

Note that in this Specification, references to various features (e.g., elements, structures, modules, components, steps, operations, characteristics, etc.) included in 'one embodiment', 'example embodiment', 'an embodiment', 'another embodiment', 'some embodiments', 'various embodiments', 'other embodiments', 'alternative embodiment', 'certain embodiments' and the like are intended to mean that any such features are included in one or more embodiments of the present disclosure, but may or may not necessarily be combined in the same embodiments. Note also that a module as used herein this Specification, can be inclusive of an executable file comprising instructions that can be understood and processed on a computer, and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and/or protocols, communication system 100 may be applicable to other exchanges or routing protocols. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving congestion information for an environment in which a user equipment (UE) is operating;
   receiving a first request to deliver content to the UE, wherein the content is associated with a service data flow and wherein the first request to deliver the content is initiated by a first Application Function (AF);
   determining that the environment in which the UE is operating is experiencing congestion based, at least in part, on the congestion information;
   determining, by a Policy and Charging Rules Function (PCRF), a deferred content identifier for identifying the content and a re-try interval, wherein the re-try interval is determined based, at least in part, on the congestion information;
   communicating the re-try interval and the deferred content identifier to the first AF by the PCRF;
   initiating, at the first AF, a second request from the first AF to the PCRF to deliver the content, wherein the second request includes, at least in part, the re-try interval and the deferred content identifier; and
   deferring delivery of the content to the UE until the re-try interval has expired, comprising:
      receiving the second request to deliver content to the UE, the second request comprising the deferred content identifier; and
      retrieving the re-try interval from storage using the deferred content identifier, determining that the retrieved re-try interval has not expired, and in response declining to deliver the content to the UE, wherein the stored re-try interval is associated with the deferred content identifier.

2. The method of claim 1, wherein the environment includes at least one cell in a Radio Access Network (RAN) in which the UE is operating that is experiencing congestion.

3. The method of claim 1,
   initiating a third request to deliver the content by the first AF when the re-try interval has expired, wherein the third request includes, at least in part, the re-try interval and the deferred content identifier;
   retrieving the deferred content identifier from storage;
   verifying that the re-try interval has expired;
   provisioning one or more policy rules for the service data flow associated with the content; and
   communicating the one or more policy rules and an indication indicating that delivery of the content has been deferred to at least one of a packet data network gateway or a traffic detection function.

4. The method of claim 3, further comprising:
   communicating the indication indicating that delivery of the content has been deferred to a charging system to set charging information for at least one of a user associated with the UE or a provider of the content.

5. The method of claim 1, wherein the re-try interval is further determined, at least in part, by one or more of:
   a subscription profile of a user associated with the UE;
   a user profile of a user associated with the UE;
   information associated with the content;
   information associated with a provider of the content; and
   current usage in the environment.

6. The method of claim 1, further comprising:
   collecting congestion measurement information for the environment;
   requesting a list of one or more user equipment in the environment and a corresponding list of active access point names for which each of the user equipment have an active session;
   determining a corresponding serving Policy and Charging Rules Function (PCRF) for each of the one or more user equipment; and
   communicating the congestion information to each corresponding PCRF for each of the one or more user equipment.

7. The method of claim 6, wherein the collecting, the requesting, the determining and the communicating are performed by a Radio Access Network (RAN) Congestion Awareness Function.

8. The method of claim 1, further comprising:
   storing at least one of the re-try interval, the deferred content identifier or identifying information for the service data flow in at least one of storage for the PCRF or storage for a subscription profile repository (SPR).

9. The method of claim 1, further comprising:
   storing the re-try interval, the deferred content identifier and identifying information for the service data flow.

10. One or more non-transitory tangible media encoding logic that includes instructions for execution by a processor, wherein the execution causes the processor to perform operations, comprising:
   receiving congestion information for an environment in which a user equipment (UE) is operating;
   receiving a first request to deliver content to the UE, wherein the content is associated with a service data flow and wherein the first request to deliver the content is initiated by a first Application Function (AF);
   determining that the environment in which the UE is operating is experiencing congestion based, at least in part, on the congestion information;
   determining, by a Policy and Charging Rules Function (PCRF), a deferred content identifier for identifying the content and a re-try interval, wherein the re-try interval is determined based, at least in part, on the congestion information;
   communicating the re-try interval and the deferred content identifier to the first AF by the PCRF;
   initiating, at the first AF, a second request from the first AF to the PCRF to deliver the content, wherein the second request includes, at least in part, the re-try interval and the deferred content identifier; and
   deferring delivery of the content to the UE until the re-try interval has expired, wherein the deferred content identifier is included when the content is delivered to the UE, comprising:

receiving the second request to deliver content to the UE, the second request comprising the deferred content identifier; and retrieving the re-try interval from storage using the deferred content identifier, determining that the retrieved re-try interval has not expired, and in response declining to deliver the content to the UE, wherein the stored re-try interval is associated with the deferred content identifier.

11. The non-transitory tangible media of claim 10, wherein the execution causes the processor to perform further operations, comprising:

initiating a third request to deliver the content by the first AF when the re-try interval has expired, wherein the third request includes, at least in part, the re-try interval and the deferred content identifier;

retrieving the deferred content identifier from storage;

verifying that the re-try interval has expired;

provisioning one or more policy rules for the service data flow associated with the content; and communicating the one or more policy rules and an indication indicating that delivery of the content has been deferred to at least one of a packet data network gateway or a traffic detection function.

12. The non-transitory tangible media of claim 11, wherein the execution causes the processor to perform further operations, comprising:

communicating the indication indicating that delivery of the content has been deferred to a charging system to set charging information for at least one of a user associated with the UE or a provider of the content.

13. The non-transitory tangible media of claim 12, wherein the re-try interval is further determined, at least in part, by one or more of:

a subscription profile of a user associated with the UE;
a user profile of a user associated with the UE;
information associated with the content;
information associated with a provider of the content; and
current usage in the environment.

14. The non-transitory tangible media of claim 10, wherein the execution causes the processor to perform further operations, comprising:

collecting congestion measurement information for the environment;

requesting a list of one or more user equipment in the environment and a corresponding list of active access point names for which each of the user equipment have an active session;

determining a corresponding serving Policy and Charging Rules Function (PCRF) for each of the one or more user equipment; and communicating the congestion information to each corresponding PCRF for each of the one or more user equipment.

15. The non-transitory tangible media of claim 10, further comprising:

storing at least one of the re-try interval, the deferred content identifier or identifying information for the service data flow in at least one of storage for the PCRF or storage for a subscription profile repository (SPR).

16. A system, comprising:

a memory element for storing data; and a processor for executing instructions associated with the data, wherein the executing causes the system to perform operations, comprising:

receiving congestion information for an environment in which a user equipment (UE) is operating;

receiving a first request to deliver content to the UE, wherein the content is associated with a service data flow and wherein the first request to deliver the content is initiated by a first Application Function (AF);

determining that the environment in which the UE is operating is experiencing congestion based, at least in part, on the congestion information;

determining, by a Policy and Charging Rules Function (PCRF), a deferred content identifier for identifying the content and a re-try interval, wherein the re-try interval is determined based, at least in part, on the congestion information;

communicating the re-try interval and the deferred content identifier to the first AF by the PCRF;

initiating, at the first AF, a second request from the first AF to the PCRF to deliver the content, wherein the second request includes, at least in part, the re-try interval and the deferred content identifier; and deferring delivery of the content to the UE until the re-try interval has expired, comprising:

receiving the second request to deliver content to the UE, the second request comprising the deferred content identifier; and retrieving the re-try interval from storage using the deferred content identifier, determining that the retrieved re-try interval has not expired, and in response declining to deliver the content to the UE, wherein the stored re-try interval is associated with the deferred content identifier.

17. The system of claim 16, wherein the executing causes the system to perform further operations, comprising:

retrieving the deferred content identifier from storage;
verifying that the re-try interval has expired;
provisioning one or more policy rules for the service data flow associated with the content;

communicating the one or more policy rules and an indication indicating that delivery of the content has been deferred to at least one of a packet data network gateway or a traffic detection function; and communicating the indication indicating that delivery of the content has been deferred to a charging system to set charging information for at least one of a user associated with the UE or a provider of the content.

18. The system of claim 16, wherein the re-try interval is further determined, at least in part, by one or more of:

a subscription profile of a user associated with the UE;
a user profile of a user associated with the UE;
information associated with the content;
information associated with a provider of the content; or
current usage in the environment.

19. The system of claim 16, wherein the executing causes the system to perform further operations, comprising:

collecting congestion measurement information for the environment;

requesting a list of one or more user equipment in the environment and a corresponding list of active access point names for which each of the user equipment have an active session;

determining a corresponding serving Policy and Charging Rules Function (PCRF) for each of the one or more user equipment; and communicating the congestion information to each corresponding PCRF for each of the one or more user equipment.

* * * * *